(12) United States Patent
Manabe

(10) Patent No.: US 11,359,988 B2
(45) Date of Patent: Jun. 14, 2022

(54) VACUUM PUMP AND LEAK DETECTOR

(71) Applicant: SHIMADZU CORPORATION, Kyoto (JP)

(72) Inventor: Masashi Manabe, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 141 days.

(21) Appl. No.: 16/871,665

(22) Filed: May 11, 2020

(65) Prior Publication Data

US 2020/0378857 A1 Dec. 3, 2020

(30) Foreign Application Priority Data

May 30, 2019 (JP) .............. JP2019-101624

(51) Int. Cl.
G01M 3/04 (2006.01)
F04D 29/34 (2006.01)
F04D 19/04 (2006.01)

(52) U.S. Cl.
CPC .............. G01M 3/04 (2013.01); F04D 19/042 (2013.01); F04D 19/044 (2013.01); F04D 19/046 (2013.01); F04D 29/34 (2013.01)

(58) Field of Classification Search
None
See application file for complete search history.

(56) References Cited

U.S. PATENT DOCUMENTS 3,168,978 A * 2/1965 Garnier .............. F04D 25/0653
415/193

FOREIGN PATENT DOCUMENTS

JP 2018-145917 A 9/2018

* cited by examiner

Primary Examiner — Peter J Bertheaud
Assistant Examiner — Geoffrey S Lee
(74) Attorney, Agent, or Firm — Renner, Otto, Boisselle & Sklar, LLP

(57) ABSTRACT

A vacuum pump comprises: a pump rotor portion configured such that multiple rotor blade stages including stacking portions formed in a ring shape and turbine blades radially formed on an outer peripheral side of the stacking portions are stacked on each other; a rotor shaft to which inner peripheral surfaces of the stacking portions of the multiple rotor blade stages stacked on each other are fixed; and a communication path allowing communication between a clearance space between the rotor shaft and each stacking portion and a pump exhaust path in which the turbine blades are arranged and discharging gas in the clearance space through the pump exhaust path.

11 Claims, 11 Drawing Sheets (FIRST MODIFICATION)

(SUCTION PORT SIDE)

(FIRST MODIFICATION)

(FIRST MODIFICATION)

(THIRD MODIFICATION)

(FOURTH MODIFICATION)

(SUCTION PORT SIDE)

VACUUM PUMP AND LEAK DETECTOR

BACKGROUND OF THE INVENTION

1. Technical Field

The present invention relates to a vacuum pump and a leak detector.

2. Background Art

In a turbo-molecular pump, multiple rotor blade stages and multiple stator blade stages are alternately arranged. In a turbo-molecular pump described in Patent Literature 1 (JP 2018-145917A), multiple stages of rotor discs provided with multiple rotor blades are provided, and a stack of the rotor discs is fixed to a shaft. Each rotor disc and the shaft are firmly fixed to each other by, e.g., a fitting method to avoid looseness or detachment due to centrifugal force in rotation or thermal expansion in a high-temperature state.

SUMMARY OF THE INVENTION

A vacuum pump comprises: a pump rotor portion configured such that multiple rotor blade stages including stacking portions formed in a ring shape and turbine blades radially formed on an outer peripheral side of the stacking portions are stacked on each other; a rotor shaft to which inner peripheral surfaces of the stacking portions of the multiple rotor blade stages stacked on each other are fixed; and a communication path allowing communication between a clearance space between the rotor shaft and each stacking portion and a pump exhaust path in which the turbine blades are arranged and discharging gas in the clearance space through the pump exhaust path.

According to the present invention, occurrence of slow leak in a vacuum pump can be prevented.

DETAILED DESCRIPTION OF THE EXEMPLARY EMBODIMENTS

In the case of fixing the stack of the multiple stages of rotor discs to the shaft, chamfers or guides are provided at stacking surfaces of the rotor discs for assembly improvement. With the chamfers, tucking of burrs or the like can be prevented, the stacking surfaces of the stacked rotor discs can closely contact each other, and tilting or the like of the rotor disc relative to the shaft can be prevented.

However, in some cases, a hermetic space is formed among the chamfered portions of the rotor discs and an outer peripheral surface of the shaft, and gas (e.g., air) is confined in such a hermetic space. For this reason, when the turbo-molecular pump is driven to perform vacuum pumping of a chamber to which the pump is attached, slow leak that the gas confined in the hermetic space gradually leaks through the stacking surfaces is easily caused. As a result, there are problems that long time is required until the chamber reaches a high-vacuum state and it takes time to sufficiently decrease the partial pressure of a gas component.

Figure 1:
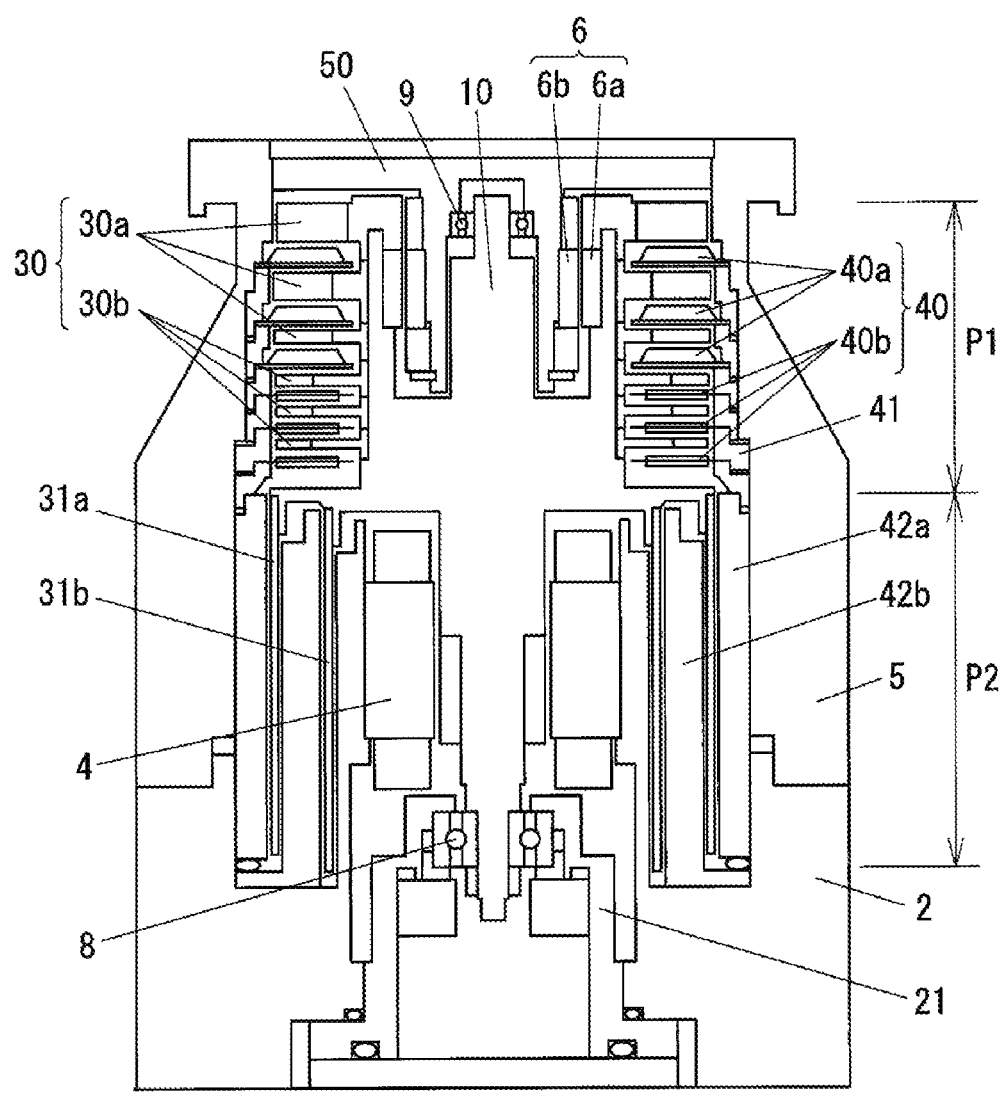
FIG. 1 is a sectional view illustrating a configuration of a vacuum pump of the present embodiment.

Hereinafter, a mode for carrying out the present invention will be described with reference to the drawings. FIG. 1 is a view for describing a configuration of a vacuum pump of the present embodiment, FIG. 1 being a sectional view of a turbo-molecular pump 1. The turbo-molecular pump 1 illustrated in FIG. 1 is drivably controlled by a not-shown control device. The turbo-molecular pump 1 includes a turbo pump portion P1 having turbine blades, and a Holweck pump portion P2 having a spiral groove.

The turbo pump portion P1 includes a pump rotor portion 30 having multiple rotor discs 30a, 30b provided with the turbine blades, and a pump stator portion 40 having multiple stator blade stages 40a, 40b provided with the turbine blades. The rotor discs 30a, 30b and the stator blade stages 40a, 40b are alternately arranged along a pump axis direction. In an example illustrated in FIG. 1, the pump rotor portion 30 includes three stages of rotor discs 30a provided on an upstream exhaust side, and three stages of rotor discs 30b provided on a downstream exhaust side. Similarly, the pump stator portion 40 includes three stages of stator blade stages 40a provided on the upstream exhaust side, and three stages of stator blade stages 40b provided on the downstream exhaust side. Six stator blade stages 40a, 40b are held by multiple spacer rings 41.

The pump rotor portion 30 including a stack of the multiple rotor discs 30a, 30b is fixed to a shaft 10 penetrating a stack portion. The rotor discs 30a, 30b are firmly fixed to the shaft 10 to avoid looseness or detachment due to centrifugal force in rotation or thermal expansion in a high-temperature state. A fixing method includes, for example, a shrink fitting method in which the shaft 10 is inserted into and fixed to the heated rotor discs 30a, 30b, a cold fitting method in which the shaft 10 cooled using, e.g., liquid nitrogen is inserted into and fixed to the rotor discs 30a, 30b, and a fitting method using both of heating and cooling.

The Holweck pump portion P2 provided on a downstream side of the turbo pump portion P1 includes a pair of rotary cylindrical portions 31a, 31b fixed to the shaft 10, and a pair of stator cylindrical portions 42a, 42b arranged on a base 2 side.

The shaft 10 is rotatably supported by a permanent magnet magnetic bearing 6 and a mechanical bearing 8, and is rotatably driven by a motor 4. The mechanical bearing 8 is held by a bearing holder 21 provided at a base 2. The permanent magnet magnetic bearing 6 includes a rotary-side permanent magnet 6a and a stationary-side permanent magnet 6b. The rotary-side permanent magnet 6a is fixed to the shaft 10. The stationary-side permanent magnet 6b is attached to a holder 50 fixed to a pump case 5. A mechanical bearing 9 is held on the holder 50.

The mechanical bearing 9 functions as a bearing configured to limit runout of a shaft upper portion in a radial direction. The shaft 10 rotates without contacting the mechanical bearing 9 upon steady rotation of the motor 4. In a case where great disturbance is applied or a case where whirling of the shaft 10 becomes greater upon acceleration or deceleration of rotation, the shaft 10 contacts an inner ring of the mechanical bearing 9.

Figure 2:
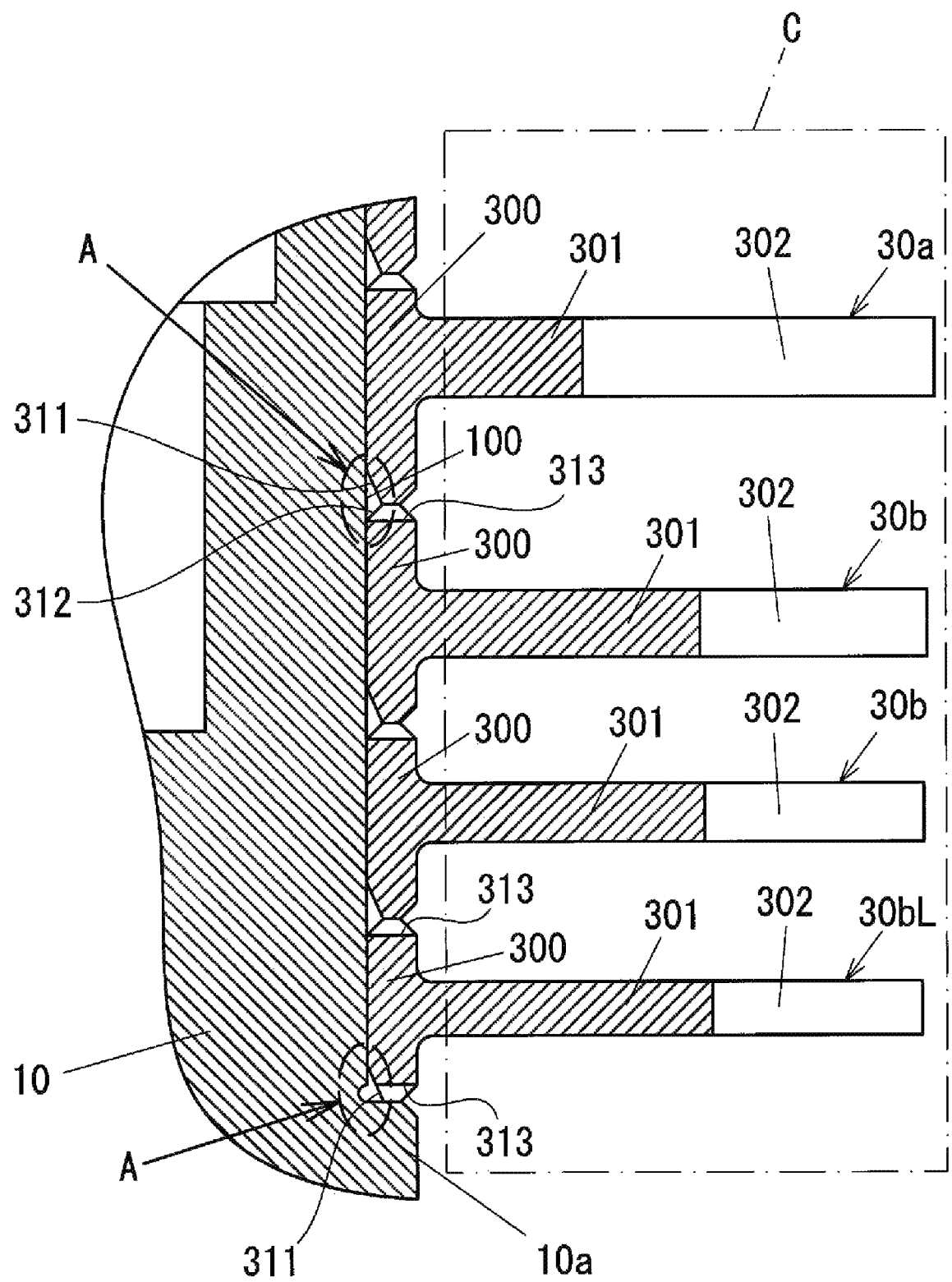
FIG. 2 is a sectional view of rotor discs fixed to a shaft.
Figure 3:
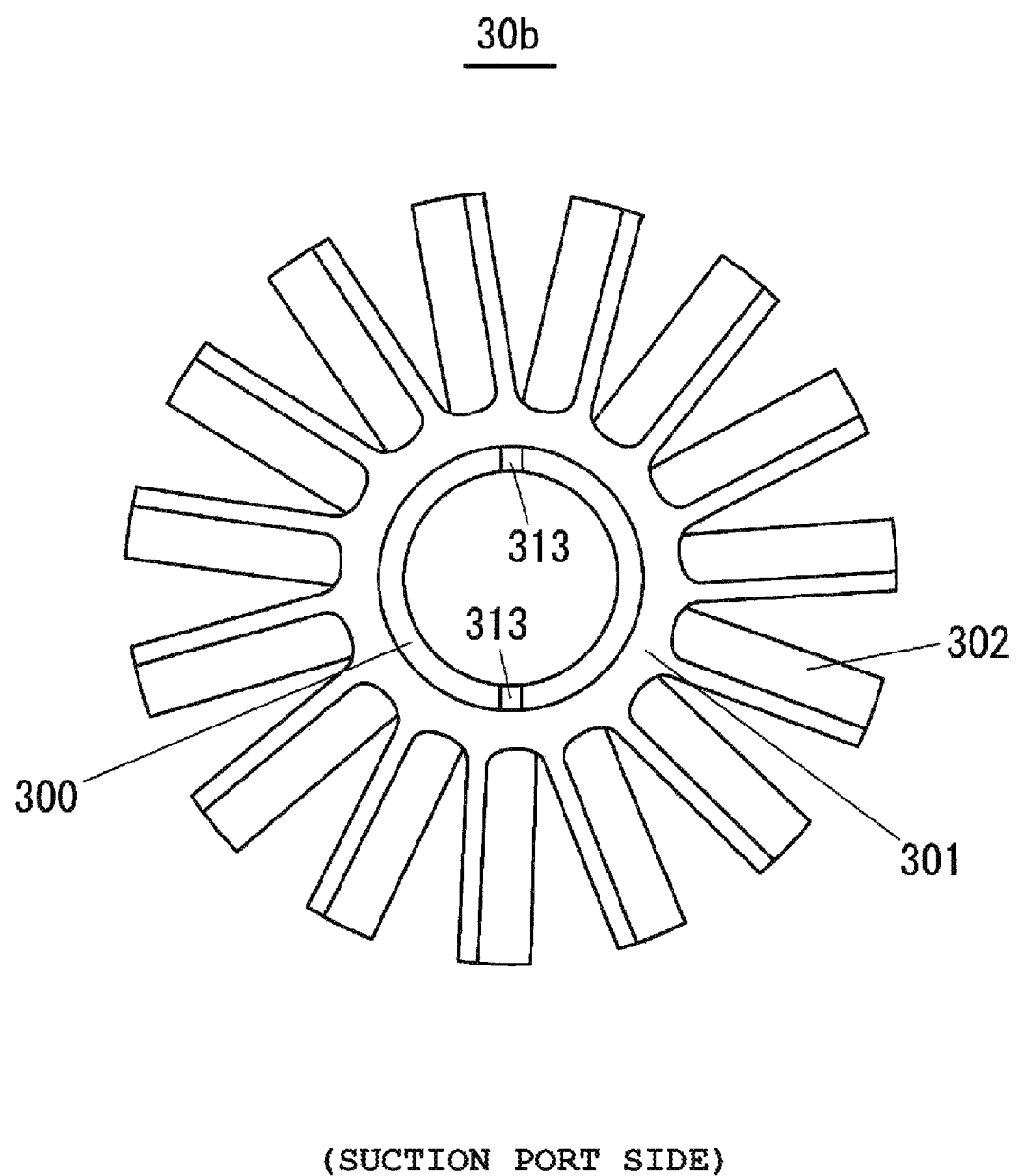
FIG. 3 is a view of the rotor disc from a suction port side.

FIGS. 2 and 3 are views for describing the rotor discs 30*a*, 30*b*. FIG. 2 is a sectional view of the rotor discs 30*a*, 30*b* fixed to the shaft 10. FIG. 3 is a view of the rotor disc 30*b* from a suction port side. The rotor disc 30*a*, 30*b* includes a stacking portion 300 as a stacking region formed at a disc center portion and fixed to the shaft 10, a flat plate-shaped ring portion 301, and turbine blades 302 radially formed from the outer periphery of the ring portion 301. As illustrated in FIG. 3, two gas venting grooves 313 penetrating the inner and outer peripheries of the stacking portion 300 are formed at a pitch of 180 degrees at a suction-port-side end surface of the stacking portion 300. At the lowermost stage of rotor disc 30*b*L illustrated in FIG. 2, gas venting grooves 313 are also provided at an exhaust-port-side end surface of the stacking portion 300.

The multiple rotor discs 30*a*, 30*b* are fixed to the shaft 10 in a state in which the stacking portions 300 are stacked. As described above, corner portions of the inner and outer peripheries of the stacking portion 300 are chamfered such that burrs or the like are not tucked under the end surface of the stacking portion 300 upon stacking. Thus, as illustrated in FIG. 2, when the multiple rotor discs 30*a*, 30*b* are stacked on each other such that the upper and lower end surfaces of the stacking portions 300 closely contact each other, gas is confined in a clearance space (hereinafter referred to as a gas accumulation space) A surrounded by surfaces 311, 312 of the chamfered portions of the stacking portions 300 and an outer peripheral surface 100 of the shaft 10. Moreover, regarding the lowermost stage of rotor disc 30*b*, the gas accumulation space A is formed between the surface 311 of the chamfered portion of the stacking portion 300 and the shaft 10.

The gas venting groove 313 penetrates the inner and outer peripheries of the stacking portion 300, and therefore, the gas accumulation space A communicates with an outer peripheral side space C of the stacking portion 300 through the gas venting groove 313. The outer peripheral side space C is a pump exhaust path in which the turbine blades 302 of the rotor discs 30*a*, 30*b* and the stator blade stages 40*a*, 40*b* are arranged, and hereinafter, the outer peripheral side space C will be referred to as a pump exhaust path C. That is, the gas venting groove 313 functions as a gas venting communication path communicating with the gas accumulation space A and the pump exhaust path C of the stacking portion 300.

Figure 4:
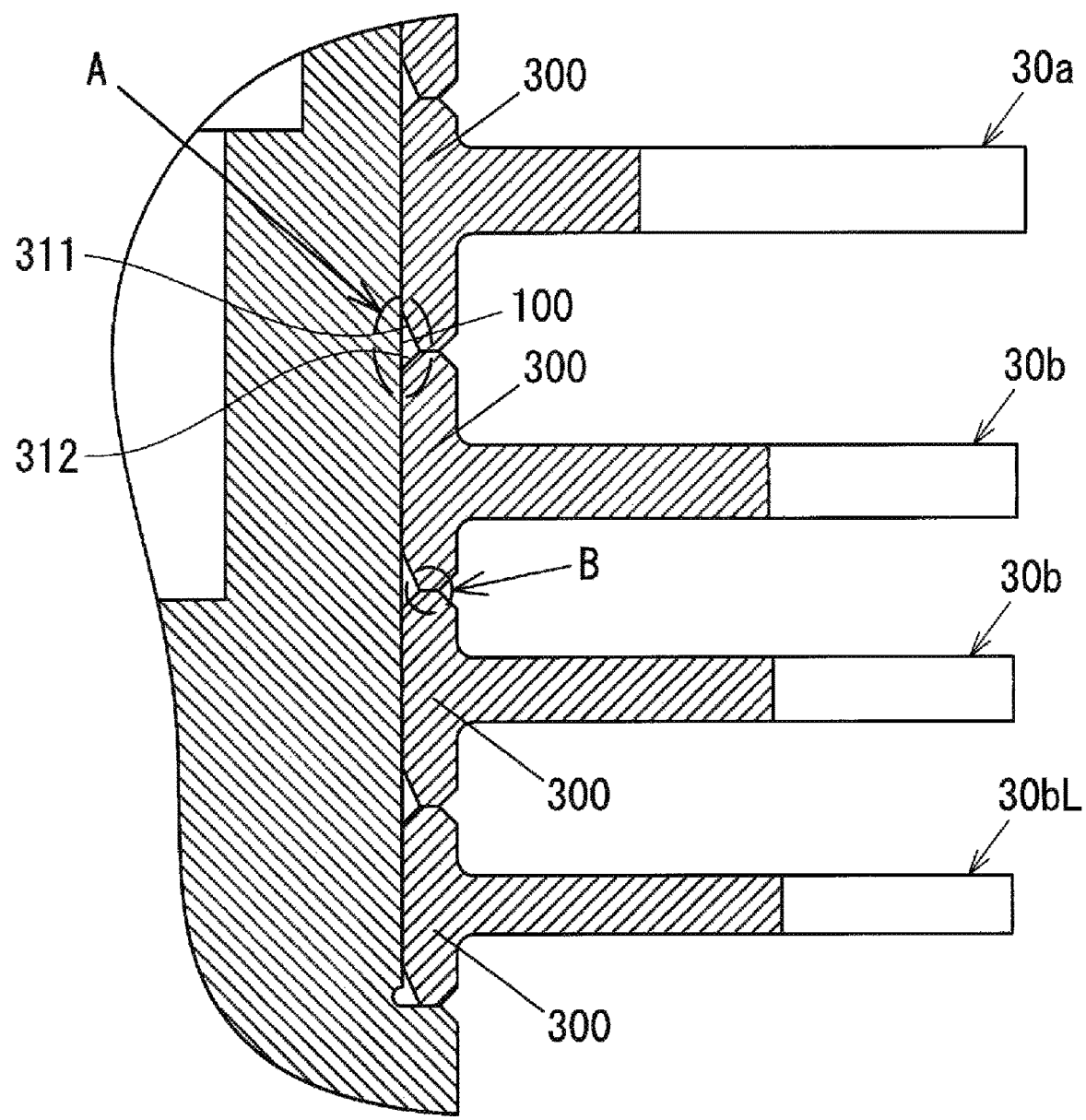
FIG. 4 is a view illustrating a comparative example.

FIG. 4 illustrates, as a comparative example, rotor discs 30*a*, 30*b* (30*b*L) without gas venting grooves 313. In the case of the comparative example, end surfaces of stacking portions 300 closely contact each other across an entire circumference at a portion indicated by a reference character B. However, an ideal close contact state is not actually brought, and due to, e.g., end surface waviness or a slight scratch, a slow leak path communicating with the inside and outside of the stacking portion 300 and having an extremely-small conductance is formed. For this reason, when an outer peripheral side space of the stacking portion 300 is brought into a vacuum state, gas confined in a gas accumulation space A extremely slowly leaks to the outer peripheral side space (i.e., a pump exhaust path C) through the above-described slow leak path over time.

For example, in the case of using a turbo-molecular pump having a structure as in the comparative example for a mass analysis device or a leak detector, the gas leaks out of the gas accumulation space A in every vacuuming. A high degree of vacuum is required for the mass analysis device and the leak detector. However, due to influence of the gas leaking out of the gas accumulation space A, a device working pressure state is not brought, or time until the working pressure state is brought is extremely long. Moreover, the leaking gas might provide an adverse effect on a mass analysis result or a leak test result.

On the other hand, in the present embodiment, the gas venting grooves 313 are formed as illustrated in FIGS. 2 and 3. Thus, when the pump exhaust path C on an outer peripheral side of the stacking portion 300 is brought into a vacuum state in association with pumping, the gas in the gas accumulation space A promptly leaks out to the pump exhaust path C through the gas venting groove 313. For example, the gas accumulation space A is brought into the vacuum state within five minutes after the start of pump operation. Thus, the gas in the gas accumulation space A does not influence the device vacuum state. The degree of ease in gas venting of the gas accumulation space A in a case where the outer peripheral side space of the stacking portion 300 is brought into the vacuum state depends on the conductance of the gas venting groove 313. Thus, the groove length and groove sectional area of the gas venting groove 313 and the number of gas venting grooves 313 are set as necessary to obtain a necessary conductance. For example, as long as the width dimension and depth dimension of a groove section are equal to or greater than 0.5 mm, a sufficient conductance for gas venting is obtained.

Regarding at which one of the upper (the suction port side) or lower end surface of the stacking portion 300 the gas venting groove 313 is formed, it may be configured such that at least one gas venting groove 313 communicating with the gas accumulation space A is provided for each of the multiple gas accumulation spaces A. Note that as described above, the lowermost stage of rotor disc 30*b*L contacts a step portion 10*a* of the shaft 10 at the lower end surface of the stacking portion 300, and therefore, the gas venting groove 313 is inevitably formed at the lower end surface.

First Modification

Figure 5:
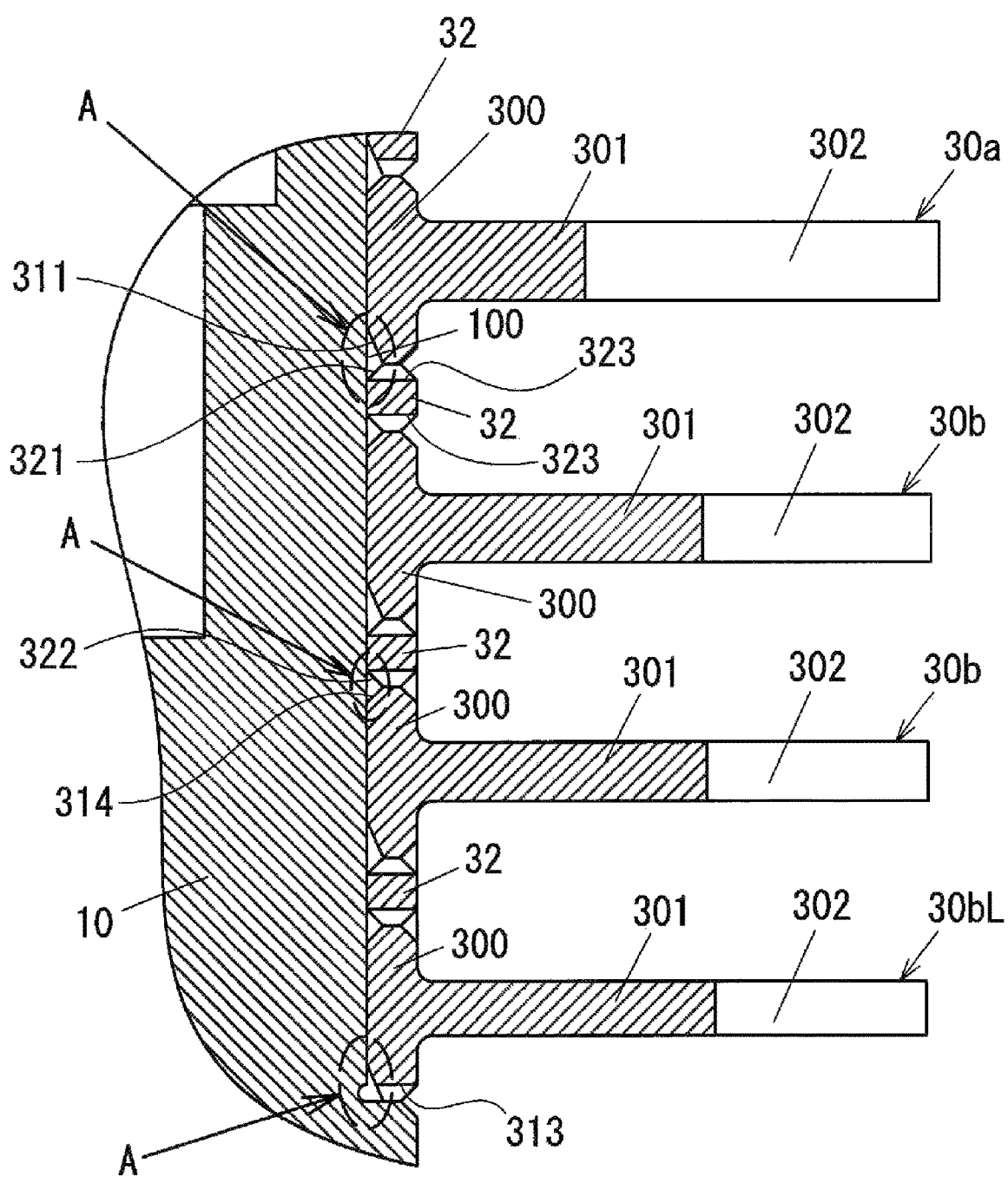
FIG. 5 is a sectional view illustrating a first modification.
Figure 6:
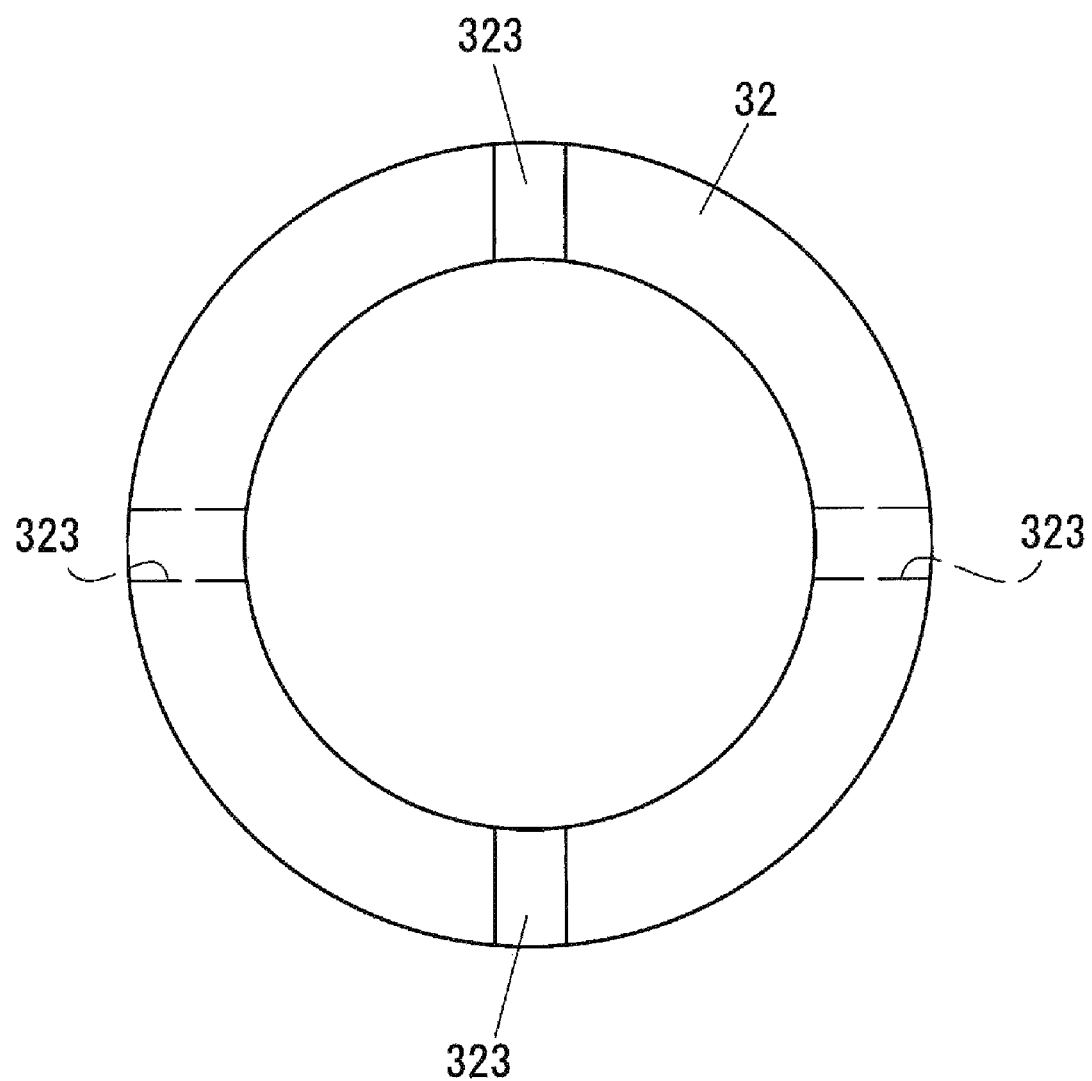
FIG. 6 is a view illustrating a spacer disc.

FIGS. 5 and 6 are views illustrating a first modification of the present embodiment. In the first modification, the multiple rotor discs 30*a*, 30*b* are stacked through spacer discs 32 as illustrated in FIG. 5, and are fixed to the shaft 10. In a configuration in which the multiple rotor discs are stacked, multiple types of rotor discs having different exhaust properties are often used in combination. Considering the case of changing the combination, the height adjustment spacer discs 32 are used in some cases.

Generally, corner portions of the spacer disc 32 are also chamfered. The gas accumulation space A surrounded by the surface 311 of the rotor disc 30*a*, 30*b*, a surface 321 of the spacer disc 32, and the outer peripheral surface 100 of the shaft 10 and the gas accumulation space A surrounded by a surface 314 of the rotor disc 30*a*, 30*b*, a surface 322 of the spacer disc 32, and the outer peripheral surface 100 of the shaft 10 are formed. Moreover, regarding the lowermost stage of rotor disc 30*b*L, the gas accumulation space A is also formed between the surface 311 of the chamfered portion of the stacking portion 300 and the shaft 10.

In the first modification, gas venting grooves 323 are formed at each end surface of the spacer disc 32 in an axial direction. As illustrated in FIG. 6, the gas venting grooves 323 are provided at two spots at each surface. Considering balance, the back-side gas venting grooves 323 are formed shifted from the front-side gas venting grooves 323 by a pitch of 90 degrees. Note that in an example illustrated in FIG. 5, the lowermost stage of rotor disc 30bL contacts, as in the case of FIG. 2, the step portion 10a of the shaft 10 at the lower end surface of the stacking portion 300. Thus, the gas venting grooves 313 are formed at each of the upper and lower end surfaces. When the outer peripheral side space of the stacking portion 300 is brought into the vacuum state, the gas in the gas accumulation space A is promptly discharged through the gas venting grooves 313, 323.

In a case where the coefficient of thermal expansion of 30bL the spacer disc 32 is different from those of the rotor discs 30a, 30b (30bL), stress is generated at a contact surface upon a temperature increase. For this reason, the spacer disc 32 and the rotor discs 30a, 30b (30bL) are preferably made of the same material. Note that in the case of the rotor discs 30a, 30b (30bL), the turbine blades 302 are radially formed, and therefore, the stress is easily generated at the gas venting groove 313 due to the centrifugal force on the turbine blade 302. On the other hand, the spacer disc 32 has a smaller diameter than those of the rotor discs 30a, 30b (30bL), and no turbine blades 302 are provided. Thus, the stress generated at the gas venting groove 323 is suppressed lower than the stress at the gas venting groove 313 formed at the stacking portion 300 of the rotor disc 30a, 30b (30bL).

Figure 7:
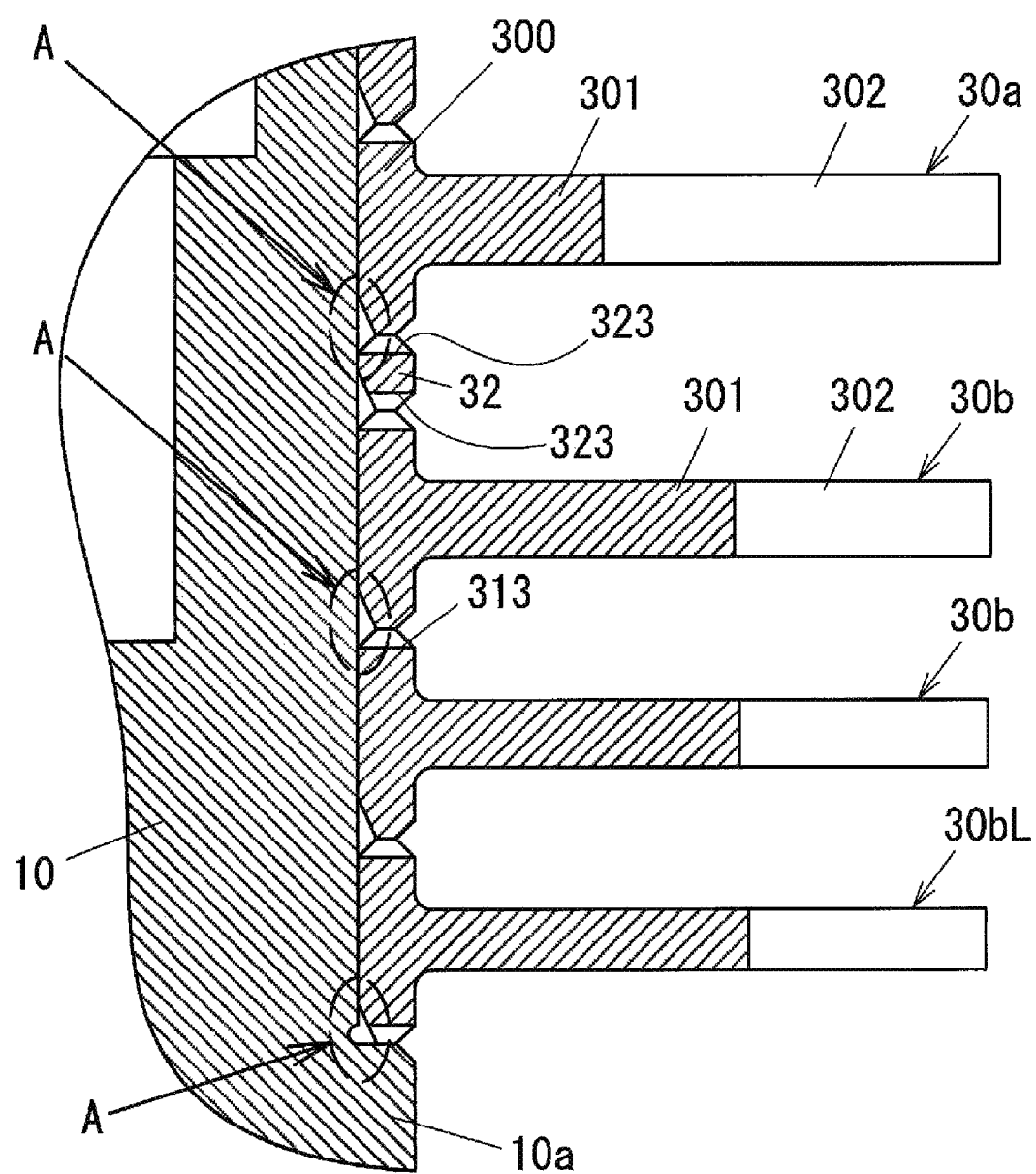
FIG. 7 is a view illustrating a case where the spacer discs are arranged on some of stacking portions.

Note that in the example illustrated in FIG. 5, the spacer discs 32 are each arranged in all portions between adjacent ones of the rotor discs 30a, 30b (30bL). However, as illustrated in FIG. 7, the spacer discs 32 may be arranged only at some portions. In a portion provided with no spacer disc 32 between the rotor discs 30a, 30b (30bL), the gas venting groove 313 is formed at at least one of the opposing surfaces of the stacking portions 300. That is, it is configured such that the gas venting groove 313 or the gas venting groove 323 is arranged in each gas accumulation space A. Note that in the case of the spacer disc 32 illustrated in FIG. 7, the gas venting groove 313 is formed at the lower stacking portion 300, and therefore, the gas venting groove 323 may be formed only at the upper surface of the spacer disc 32.

Second Modification

Figure 8:
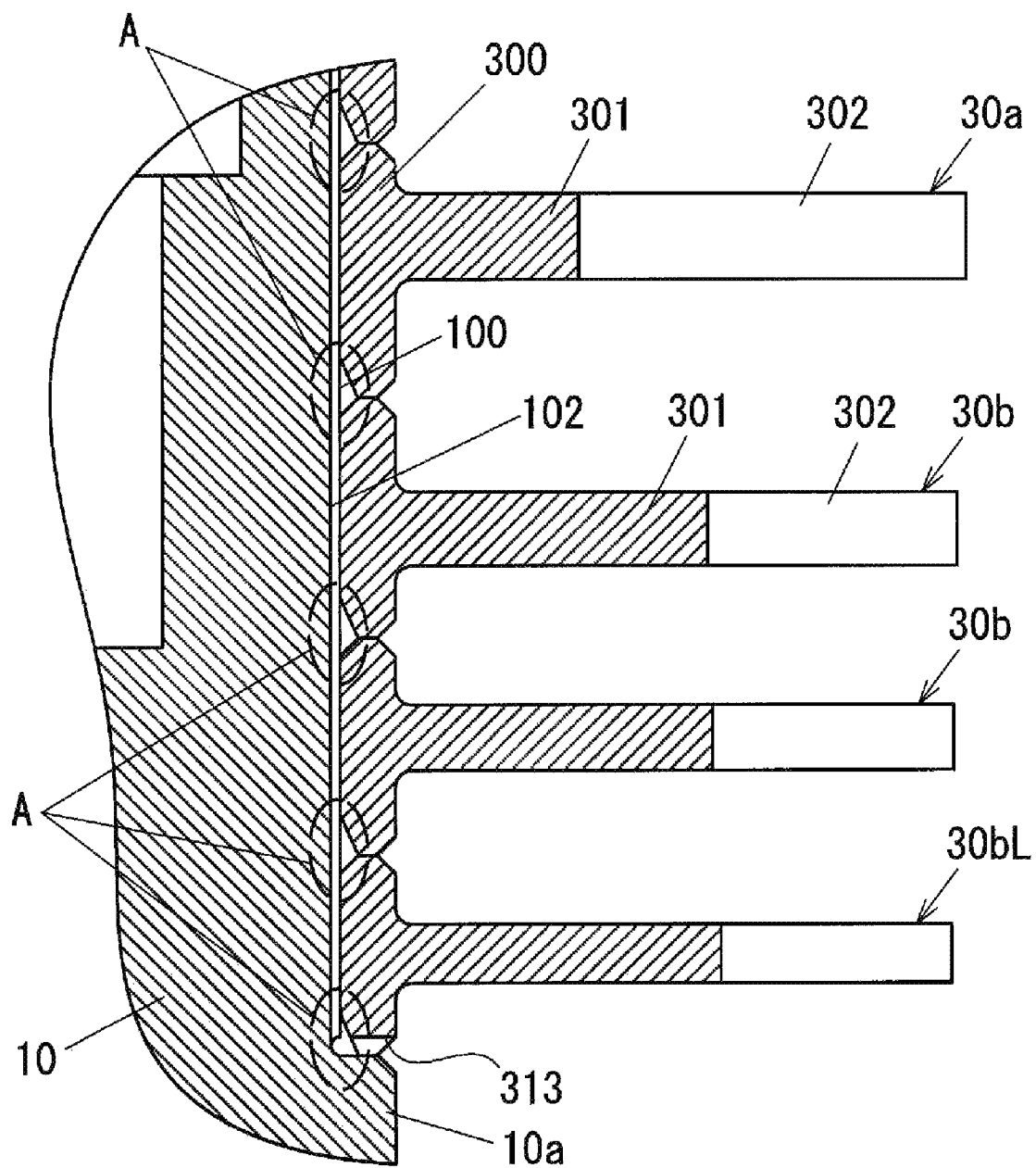
FIG. 8 is a sectional view illustrating a second modification.

FIG. 8 is a view illustrating a second modification of the present embodiment. In the second modification, at least one gas venting groove 102 extending along the axial direction of the shaft 10 is formed at the outer peripheral surface 100 of the shaft 10. The gas venting groove 102 communicates with each of the multiple gas accumulation spaces A, and communicates with the outer peripheral side space (i.e., the pump exhaust path) of the stacking portion 300 through the gas venting groove 313 formed at the stacking portion 300 of the lowermost stage of rotor disc 30bL. The gas confined in each gas accumulation space A is discharged through the gas venting groove 102 and the gas venting groove 313 communicating with each other. Note that the rotor disc provided with the gas venting groove 313 is not limited to the lowermost stage of rotor disc 30bL, and the gas venting groove 313 may be provided at at least any one of the rotor discs 30a, 30b, 30bL. Similar advantageous effects are provided.

Moreover, instead of forming the gas venting groove 313 at the stacking portion 300 of the rotor disc 30a, 30b, 30bL, the gas venting groove may be formed along a radial direction at an upper surface of the step portion 10a of the shaft 10 contacting the stacking portion 300.

Third Modification

Figure 9:
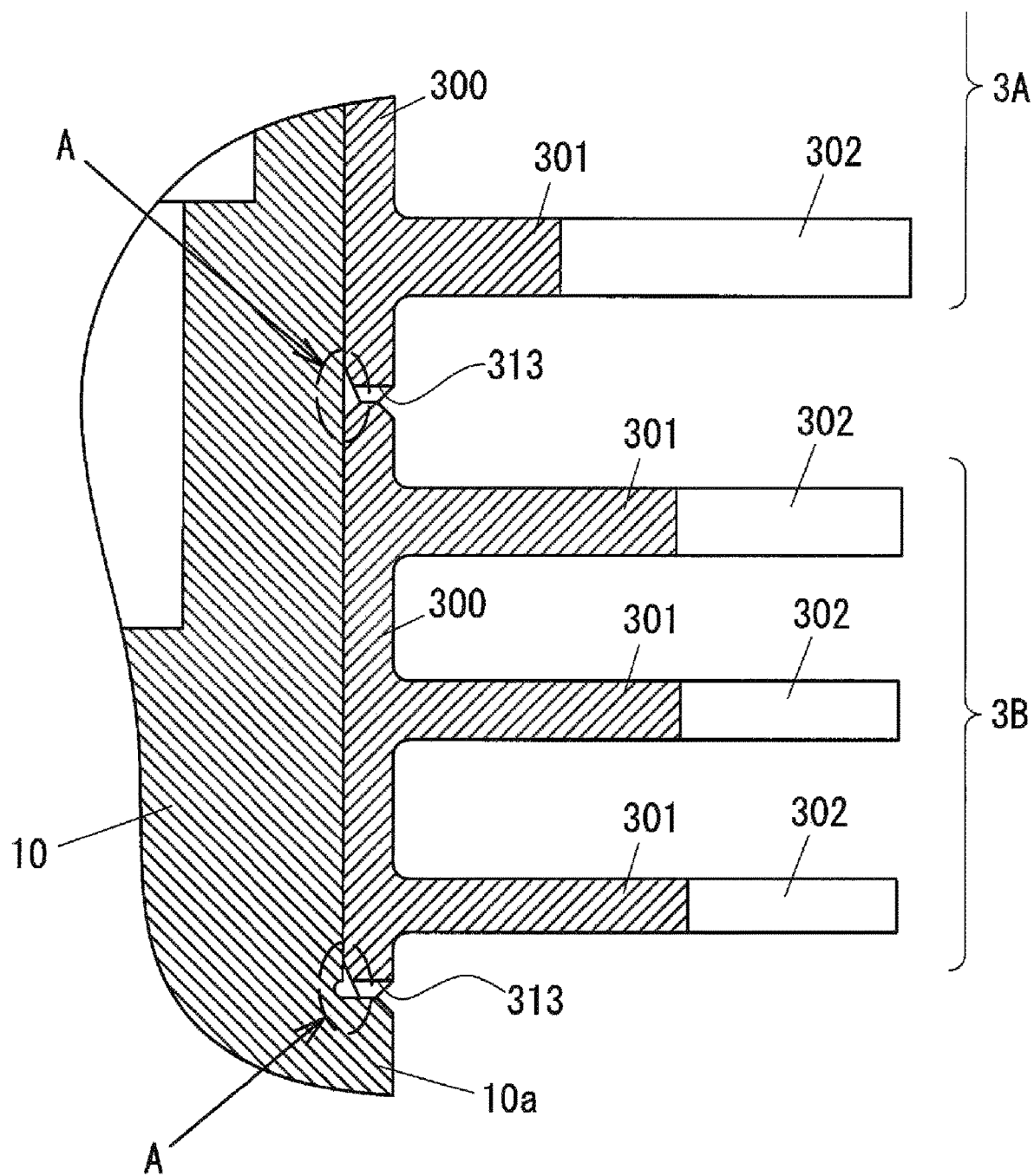
FIG. 9 is a sectional view illustrating a third modification.

FIG. 9 is a view illustrating a third modification of the present embodiment. Of six stages of rotor discs 30a, 30b, three stages of rotor discs 30a on the upstream exhaust side are, in the third modification, integrally formed as a single first rotor blade stage 3A, and three stages of rotor discs 30b on the downstream exhaust side are integrally formed as a single second rotor blade stage 3B. Each of the rotor blade stages 3A, 3B includes a stacking portion 300, three stages of ring portions 301, and the turbine blades 302 each radially formed from the ring portions 301.

The gas venting groove 313 is formed at at least one of both end surfaces of the stacking portion 300. In an example illustrated in FIG. 9, the gas venting groove 313 is formed at the lower end surface of the stacking portion 300 of the rotor blade stage 3A, 3B. Thus, the gas confined in the gas accumulation space A formed between the stacking portion 300 and the shaft 10 is discharged through the gas venting groove 313.

Fourth Modification

Figure 10:
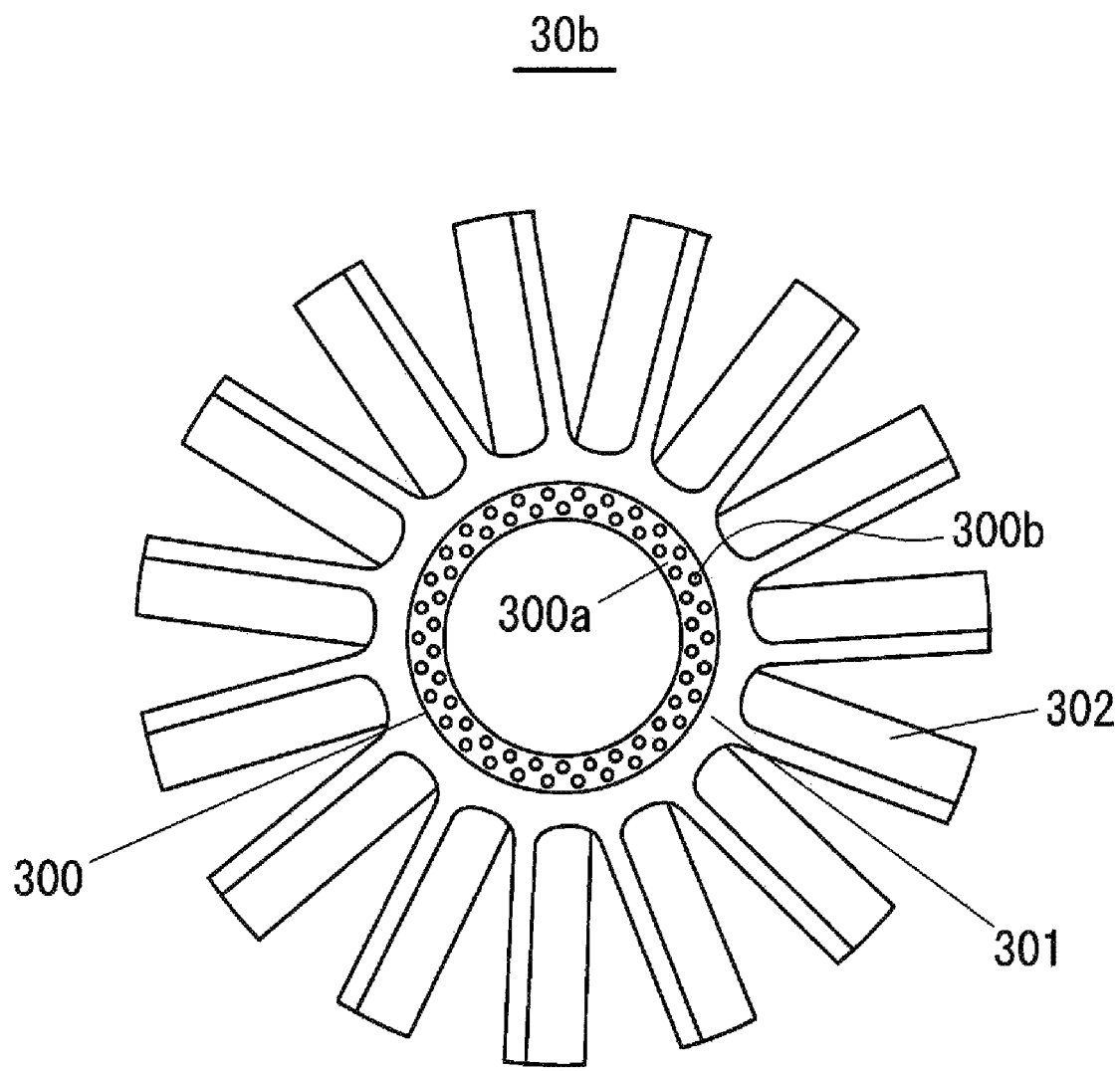
FIG. 10 is a sectional view illustrating a fourth modification.

FIG. 10 is a view illustrating a fourth modification of the present embodiment. In an example illustrated in FIGS. 2 and 3, the gas venting groove 313 is formed at the end surface of the stacking portion 300 of the rotor disc 30a, 30b to form the gas venting communication path. In the fourth modification, multiple raised portions 300b having the same height are formed at one end surface 300a (in FIG. 10, the suction-port-side surface) of the stacking portion 300. The other end surface of the stacking portion 300 is in a planar shape.

When the multiple rotor discs 30a, 30b are stacked, the stacking portions 300 contact each other, and a top surface of each raised portion 300b formed at the suction-port-side end surface 300a of the stacking portion 300 and the back surface of the adjacent stacking portion 300 on the suction port side contact each other. As a result, a region provided with the end surface 300a is a clearance region, and such a clearance region functions as a communication path allowing communication between an inner peripheral side and the outer peripheral side of the stacking portion 300.

Schematic Configuration of Leak Detector

Figure 11:
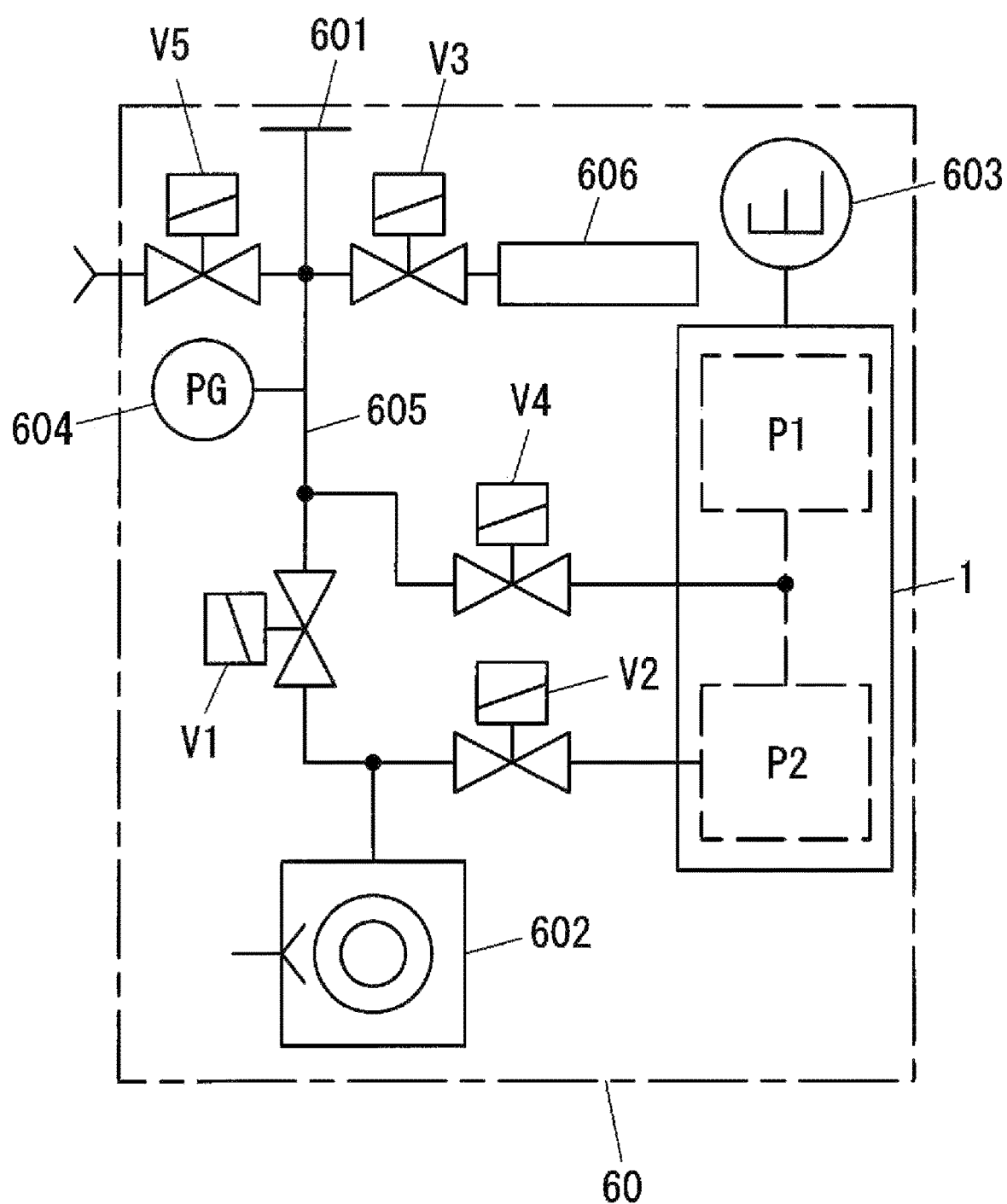
FIG. 11 is a view illustrating one example of a leak detector.

As described above, in the turbo-molecular pump 1, the gas confined in the gas accumulation space A can be quickly discharged through the communication path (e.g., the gas venting groove 313). Thus, the turbo-molecular pump 1 is suitable as a vacuum pump for the mass analysis device or the leak detector requiring high vacuum environment. FIG. 11 is a view illustrating one example of the leak detector, FIG. 11 illustrating a schematic configuration of the leak detector.

The leak detector 60 illustrated in FIG. 11 is configured to detect carrier gas (leak test gas) by an inverse diffusion measurement method, and detects the carrier gas inversely diffused to an upstream side in the turbo pump portion P1 by an analyzer tube 603 to obtain a leak amount.

A test subject (not shown) for which leak test is performed is attached to a test port 601 of the leak detector 60. A pipe 605 provided with the test port 601 is connected to a roughing pump 602 through a roughing valve V1. For example, an oil rotary pump is used as the roughing pump 602.

The analyzer tube 603 is subjected to gas discharging by the turbo-molecular pump 1 including the turbo pump portion P1 and the Holweck pump portion P2. The roughing pump 602 is connected to the turbo-molecular pump 1 through a foreline valve V2, and is also used as a back pump of the turbo-molecular pump 1. The pipe 605 is connected to a back pressure side of the turbo pump portion P1, i.e., between the turbo pump portion P1 and the Holweck pump portion P2, through a test valve V4. The pipe 605 is also provided with a calibration valve V3 and a vent valve V5, and a calibration standard leak 606 is detachably connected to the calibration valve V3. The internal pressure of the pipe 605 is detected by a pressure gauge 604.

When the leak detector 60 is started, the roughing pump 602, the turbo-molecular pump 1, and the analyzer tube 603 are started. The valve V2 is in an open state, other valves V1, V3 to V5 are in a closed state. By a series configuration of the turbo-molecular pump 1 and the roughing pump 602, gas discharging from the inside of the analyzer tube 603 is performed until a predetermined background value (the degree of vacuum).

Calibration Process

After the test port 601 has been covered, the roughing valve V1 is opened, and gas discharging from the pipe 605 is performed by the roughing pump 602. When the inside of the pipe 605 reaches a predetermined pressure, the roughing valve V1 is closed, and thereafter, the test valve V4 and the calibration valve V3 are opened. As a result, calibration carrier gas (e.g., helium gas) in the calibration standard leak 606 flows out to the pipe 605, and reaches the back pressure side of the turbo pump portion P1 through the test valve V4. Then, calibration is performed.

Leak Test

The case of a leak test for a small container (a test target) such as a package will be described by way of example. The test target is filled with the carrier gas such as He gas. After the test target filled with the carrier gas has been housed in the test port 601, a lid of the test port 601 is closed, and a test begins. The roughing valve V1 is opened, and gas discharging from the pipe 605 is performed by the roughing pump 602. When the inside of the pipe 605 reaches the predetermined pressure, the roughing valve V1 is closed, and thereafter, the test valve V4 is opened. The carrier gas having leaked from the test target reaches the back pressure side of the turbo pump portion P1 through the test valve V4, and is detected by the analyzer tube 603. In this manner, a leak amount is measured.

In the turbo-molecular pump 1 of the present embodiment, the gas confined in the gas accumulation space A is promptly discharged, and therefore, an adverse effect of the gas confined in the gas accumulation space A on carrier gas detection in the analyzer tube 603 can be prevented.

It is understood by those skilled in the art that the above-described multiple exemplary embodiments and modifications are specific examples of the following aspects.

[1] A vacuum pump according to one aspect includes a pump rotor portion configured such that multiple rotor blade stages having stacking portions formed in a ring shape and turbine blades radially formed on an outer peripheral side of the stacking portions are stacked on each other, a rotor shaft to which inner peripheral surfaces of the stacking portions of the multiple rotor blade stages stacked on each other are fixed, and a communication path allowing communication between a clearance space between the rotor shaft and the stacking portion and a pump exhaust path in which the turbine blades are arranged and discharging gas in the clearance space through the pump exhaust path.

For example, as illustrated in FIG. 2, the communication path (i.e., the gas venting groove 313) allowing communication between the clearance space (i.e., the gas accumulation space A) between the shaft 10 and the stacking portion 300 and the pump exhaust path C in which the turbine blades 302 are arranged is provided, and therefore, the gas confined in the gas accumulation space A formed among the stacking portions 300 and the shaft 10 can be quickly discharged through the communication path. As a result, slow leak as in a typical case can be prevented.

[2] In the vacuum pump according to [1] above, the clearance space is a space surrounded by inner peripheral chamfered portions of the stacking portions and an outer peripheral surface of the rotor shaft.

[3] In the vacuum pump according to [1] or [2] above, the communication path is formed at a stacking surface of the stacking portion. For example, as illustrated in FIG. 2, the gas venting groove 313 is, as the communication path allowing communication between the clearance space (i.e., the gas accumulation space A) and the pump exhaust path, formed at the stacking surface of the stacking portion 300. Thus, the gas confined in the gas accumulation space A can be quickly discharged through the gas venting groove 313.

[4] The vacuum pump according to [1] above further includes a spacer sandwiched by the stacking portions of adjacent two of the rotor blade stages in an axial direction. The communication path is formed at at least one of front and back surfaces of the spacer facing the stacking portions. For example, as illustrated in FIG. 5, the spacer disc 32 is sandwiched between the pair of rotor discs 30b, and the gas venting groove 323 as the communication path is formed at at least one of the front and back surfaces of the spacer disc 32. Thus, the gas confined in the gas accumulation space A can be quickly discharged through the gas venting groove 323.

[5] In the vacuum pump according to [1] to [4] above, the communication path is a groove penetrating from a rotor shaft fixing side of the stacking portion to the outside of the stacking portion in a radial direction. For example, as illustrated in FIG. 2, the gas venting groove 313 penetrating from the rotor shaft fixing side of the stacking portion 300 to the outside in the radial direction may be provided as the communication path. The communication path can be formed by grooving, and therefore, cost reduction can be realized.

[6] In the vacuum pump according to any one of [1] to [5] above, each stacking portion is fixed to the rotor shaft by interference fit. By fixing by interference fit, each rotor blade stage can be firmly fixed to the rotor shaft.

[7] A leak detector according to one aspect includes an analyzer tube configured to detect leak test gas; and the vacuum pump according to any one of [1] to [6] above, the vacuum pump performing vacuum pumping of the analyzer tube. The leak test gas having leaked from a test target is introduced into the analyzer tube, and a leak amount of the test target is measured. In the vacuum pump according to any one of [1] to [6], slow leak can be prevented, and therefore, a leak detector exhibiting excellent test accuracy can be configured.

[8] In the vacuum pump according to [5] above, width dimension and depth dimension of a groove section are equal to or greater than 0.5 mm.

[9] In the vacuum pump according to [1] above, the vacuum pump according to claim 1, further comprising: a spacer sandwiched by the stacking portions of adjacent two of the rotor blade stages in an axial direction. The communication paths are provided at two spots at each front and back surfaces of the spacer facing the stacking portions. The communication paths of the back surfaces are provided shifted from the communication paths of the front surfaces by a pitch of 90 degrees.

[10] In the vacuum pump according to [1] above, the communication path includes: a first groove extending along an axial direction of the rotor shaft at an outer peripheral surface of the rotor shaft and, a second groove penetrating from a rotor shaft fixing side of one stacking portion to an outside of the one stacking portion in a radial direction.

[11] In the vacuum pump according to [1] above, the communication path includes: multiple raised portions having the same height formed at one end surface of each stacking portion.

[12] A mass analysis device according to one aspect comprises the vacuum pump according to any one of [1] to [6] above.

Various embodiments and modifications have been described above, but the present invention is not limited to these contents. Other aspects conceivable within the scope of the technical idea of the present invention are also included in the scope of the present invention. For example, in the above-described embodiment, the vacuum pump including the turbo pump portion and the Holweck pump portion has been described by way of example. However, the present invention is also applicable to a vacuum pump including, e.g., a Siegbahn pump instead of the Holweck pump portion or a vacuum pump including only a turbo pump portion. Moreover, even in a case where the method for fixing the rotor disc to the shaft is not the fitting method, if a structure in which the multiple rotor discs are fixed to penetrate the shaft is employed, the gas accumulation space is formed between the stacking portion of the rotor disc and the shaft, and therefore, the present invention is applicable to such a case.

What is claimed is:

1. A vacuum pump comprising:
a pump rotor portion configured such that multiple rotor blade stages including stacking portions formed in a ring shape and turbine blades radially formed on an outer peripheral side of the stacking portions are stacked on each other;
a rotor shaft to which inner peripheral surfaces of the stacking portions of the multiple rotor blade stages stacked on each other are fixed; and
a communication path allowing communication between a clearance space between the rotor shaft and each stacking portion and a pump exhaust path in which the turbine blades are arranged and discharging gas in the clearance space through the pump exhaust path,
wherein each stacking portion is fixed to the rotor shaft by interference fit.

2. The vacuum pump according to claim 1, wherein the clearance space is a space surrounded by inner peripheral chamfered portions of the stacking portions and an outer peripheral surface of the rotor shaft.

3. The vacuum pump according to claim 1, wherein the communication path is formed at a stacking surface of each stacking portion.

4. The vacuum pump according to claim 1, further comprising:
a spacer sandwiched by the stacking portions of adjacent two of the rotor blade stages in an axial direction,
wherein the communication path is formed at at least one of front and back surfaces of the spacer facing the stacking portions.

5. The vacuum pump according to claim 1, wherein the communication path is a groove penetrating from a rotor shaft fixing side of each stacking portion to an outside of the each stacking portion in a radial direction.

6. The vacuum pump according to claim 5, wherein width dimension and depth dimension of a groove section are equal to or greater than 0.5 mm.

7. A leak detector comprising:
an analyzer tube configured to detect leak test gas; and
the vacuum pump according to claim 1, the vacuum pump performing vacuum pumping of the analyzer tube,
wherein the leak test gas having leaked from a test target is introduced into the analyzer tube, and a leak amount of the test target is measured.

8. The vacuum pump according to claim 1, further comprising:
a spacer sandwiched by the stacking portions of adjacent two of the rotor blade stages in an axial direction,
wherein the communication paths are provided at two spots at each front and back surfaces of the spacer facing the stacking portions and
the communication paths of the back surfaces are provided shifted from the communication paths of the front surfaces by a pitch of 90 degrees.

9. The vacuum pump according to claim 1, wherein the communication path includes:
multiple raised portions having the same height formed at one end surface of each stacking portion.

10. A mass analysis device comprising: the vacuum pump according to claim 1.

11. A vacuum pump comprising:
a pump rotor portion configured such that multiple rotor blade stages including stacking portions formed in a ring shape and turbine blades radially formed on an outer peripheral side of the stacking portions are stacked on each other;
a rotor shaft to which inner peripheral surfaces of the stacking portions of the multiple rotor blade stages stacked on each other are fixed; and
a communication path allowing communication between a clearance space between the rotor shaft and each stacking portion and a pump exhaust path in which the turbine blades are arranged and discharging gas in the clearance space through the pump exhaust path,
wherein
the communication path includes:
a first groove extending along an axial direction of the rotor shaft at an outer peripheral surface of the rotor shaft and,
a second groove penetrating from a rotor shaft fixing side of one stacking portion to an outside of the one stacking portion in a radial direction.

* * * * *